(12) United States Patent
Nakamura et al.

(10) Patent No.: US 10,439,770 B2
(45) Date of Patent: Oct. 8, 2019

(54) BASE STATION DEVICE AND TERMINAL DEVICE

(71) Applicant: SHARP KABUSHIKI KAISHA, Sakai, Osaka (JP)

(72) Inventors: Osamu Nakamura, Sakai (JP); Tomoki Yoshimura, Sakai (JP); Jungo Goto, Sakai (JP); Yasuhiro Hamaguchi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 23 days.

(21) Appl. No.: 15/573,610

(22) PCT Filed: May 13, 2016

(86) PCT No.: PCT/JP2016/064220
§ 371 (c)(1),
(2) Date: Nov. 13, 2017

(87) PCT Pub. No.: WO2016/182041
PCT Pub. Date: Nov. 17, 2016

(65) Prior Publication Data
US 2018/0102882 A1    Apr. 12, 2018

(30) Foreign Application Priority Data

May 14, 2015   (JP) .................................. 2015-098652

(51) Int. Cl.
*H04L 5/00*        (2006.01)
*H04J 11/00*       (2006.01)
(Continued)

(52) U.S. Cl.
CPC .............. *H04L 5/001* (2013.01); *H04J 11/00* (2013.01); *H04L 1/0003* (2013.01);
(Continued)

(58) Field of Classification Search
CPC ......... H04L 5/001; H04L 1/0003; H04J 11/00
See application file for complete search history.

(56) References Cited

U.S. PATENT DOCUMENTS 9,860,103 B2 *   1/2018  Shin .................... H04L 1/206
2010/0113048 A1  5/2010  Sawahashi et al.
(Continued)

FOREIGN PATENT DOCUMENTS

CN      106105071 A    11/2016
EP        2983406 A1     2/2016
(Continued)

OTHER PUBLICATIONS

Intel Corporation: "Signaling to support multi-user superposition transmission", R1-156533, 3GPP TSG RAN WG1 Meeting #83, Anaheim, USA, Nov. 15-22, 2015.
(Continued)

*Primary Examiner* — Chandrahas B Patel
(74) *Attorney, Agent, or Firm* — ScienBiziP, P.C.

(57) ABSTRACT

The objective of the invention is to achieve efficient downlink non-orthogonal multiple access using a limited amount of control information. A base station device that adds and transmits symbols addressed to a first terminal device and one or more second terminal devices, using portion of available subcarriers, includes: a power setting unit that sets the first terminal device to a lower energy than the one or more second terminal devices; a scheduling unit that, for signals addressed to the one or more second terminal devices, performs resource allocation that is different from resource allocation for a signal addressed to the first terminal device; and an MCS determining unit that controls modulation schemes such that, when allocating resources for the signal addressed to the first terminal device, the modulation schemes used by the one or more second terminal devices,
(Continued)

to be added to the signal addressed to the first terminal device, are the same.

4 Claims, 11 Drawing Sheets

(51) Int. Cl.
*H04W 72/04* (2009.01)
*H04L 1/00* (2006.01)
*H04W 28/02* (2009.01)
*H04W 52/02* (2009.01)
*H04W 74/00* (2009.01)

(52) U.S. Cl.
CPC .......... *H04L 5/0046* (2013.01); *H04L 5/0091* (2013.01); *H04W 28/0215* (2013.01); *H04W 52/0235* (2013.01); *H04W 72/04* (2013.01); *H04W 74/006* (2013.01); *Y02D 70/00* (2018.01); *Y02D 70/1262* (2018.01); *Y02D 70/1264* (2018.01)

(56) References Cited

U.S. PATENT DOCUMENTS

| | | |
|---|---|---|
| 2014/0029562 A1 | 1/2014 | Kishiyama |
| 2014/0086372 A1 | 3/2014 | Kishiyama et al. |
| 2015/0036651 A1 | 2/2015 | Takeda et al. |
| 2015/0271830 A1 | 9/2015 | Shin et al. |

FOREIGN PATENT DOCUMENTS

| | | |
|---|---|---|
| EP | 3288203 A1 | 2/2018 |
| JP | 2013-009288 A | 1/2013 |
| JP | 2013-009289 A | 1/2013 |
| WO | 2008/136468 A1 | 11/2008 |
| WO | 2013/054696 A1 | 4/2013 |
| WO | 2014/162819 A1 | 10/2014 |

OTHER PUBLICATIONS

International Search Report of PCT/JP2016/064220.
Media Tek Inc., "Evaluation Methodology for Downlink Multiuser Superposition Transmission," R1-151654, Belgrade, Serbia, Apr. 20-24, 2015.
Osamu Nakamura et al., "Frequency Selection Diversity Effect for Downlink Non-Orthogonal Multiple Access with Maximum Likelihood Detection", IEICE Technical Report, Jan. 15, 2015 (Jan. 15, 2015), vol. 114, No. 395, pp. 91 to 96 (See English translation of Abstract)
NTT DOCOMO, Evaluation methodologies for downlink multiuser superposition transmissions, 3GPP TSG-RAN WG1 Meeting #80bis R1-152063, Belgrade, Serbia, Apr. 20-24, 2015.

* cited by examiner

BASE STATION DEVICE AND TERMINAL DEVICE

TECHNICAL FIELD

The present invention relates to a base station device and a terminal device.

BACKGROUND ART

The recent spread of smartphones and tablets has led to a drastic increase in radio traffic. Fifth-generation mobile communication systems (5G) are being researched and developed in order to cope with the increase in traffic.

An access scheme called Orthogonal Frequency Division Multiple Access (OFDMA), in which many narrow-band carriers (subcarriers) are arranged orthogonally (orthogonal multiple access), is used in Long Term Evolution (LTE) and LTE-Advanced (LTE-A) downlinks. However, non-orthogonal multiple access techniques are being investigated extensively as access techniques for 5G. In non-orthogonal multiple access, signals that do not have orthogonality are transmitted with the assumption that interference cancellation or reception processing such as maximum likelihood estimation will be carried out by a receiver. Downlink Non-Orthogonal Multiple Access (DL-NOMA) is being examined as non-orthogonal multiple access for downlinks (PTL 1, PTL 2). In DL-NOMA, a base station device (also called "evolved Node B" (eNB) or "base station") adds (superposition coding) and transmits modulation symbols addressed to multiple terminal devices (also called "User Equipment" (UE), "mobile station devices", "mobile stations", or "terminals"). At this time, the transmit power allocated to each modulation symbol is determined in light of the receive power (reception quality) at the multiplexed terminal devices, the modulation and coding scheme (MCS; modulation scheme and coding rate), and the like. Each terminal device includes a CodeWord-level Interference Canceller (CWIC), and can extract only the modulation symbol addressed to itself by decoding the signals addressed to other terminal devices contained in the multiplexed transmit signal, generating replicas of the signals addressed to the other terminal devices, and canceling those from the received signal.

Having a terminal device apply Symbol-Level IC (SLIC) or Maximum Likelihood Detection (MLD) instead of CIVIC is &so being investigated (NPL 1). Although signals addressed to other terminal devices sometimes cannot be completely eliminated, applying SLIC or MLD does make it possible to implement DL-NOMA without using information pertaining to signals addressed to other terminal devices (coding rate, resource allocation information, and the like).

CITATION LIST

Patent Document

[PATENT DOCUMENT 1] JP 2013-9288 A
[PATENT DOCUMENT 2] JP 2013-9289 A

CITATION LIST

Non-Patent Document

[NON-PATENT DOCUMENT 1] MediaTek, "Evaluation Methodology for Downlink Multiuser Superposition Transmission", R1-151654, April 2015.

DISCLOSURE OF THE INVENTION

Problems to be Solved by the Invention

In DL-NOMA using SLIC or MLD, it is not necessary to know the coding rates, resource allocations, and the like of signals addressed to other terminals. However, it is necessary to know what modulation schemes are used by the signals addressed to other terminals in the resources (subcarriers) used by the station itself.

Having been conceived in light of such circumstances, an object of the present invention is to provide a DL-NOMA system capable of improving DL-NOMA performance without an increase in control information.

Means for Solving the Problems

To solve the above-described problems, a terminal device and a base station device according to the present invention are as follows.

(1) A base station device according to the present invention is a base station device that adds and transmits symbols addressed to a first terminal device and one or more second terminal devices, using a portion of subcarriers. The base station device includes: a power setting unit that sets the first terminal device to a lower energy than the one or more second terminal devices; a scheduling unit that, for signals addressed to the one or more second terminal devices, performs resource allocation that is different from resource allocation for a signal addressed to the first terminal device; and an MCS determination unit that controls modulation schemes such that, when allocating resources for the signal addressed to the first terminal device, the modulation schemes used by the one or more second terminal devices, to be added to the signal addressed to the first terminal device, are the same.

(2) In the base station device according to the present invention, the scheduling unit carries out scheduling such that the allocation of resources to the signal addressed to the first terminal device is included in the allocation of resources to the signal addressed to any one of the one or more second terminal devices.

(3) In the base station device according to the present invention, the scheduling unit carries out scheduling so that the allocation of resources to the signal addressed to the first terminal device includes the allocation of resources to the signals addressed to the one or more second terminal devices, and the MCS determination unit sets the modulation schemes of the signals addressed to the one or more second terminal devices to be the same.

(4) The base station device according to the present invention further TIC hides a control information multiplexing unit that multiplexes the modulation scheme used, by the one or more second terminal devices onto control information communicated to the first terminal device.

(5) A terminal device according to the present invention is a terminal device that, using a portion of subcarriers, receives a signal to which a symbol addressed to a first terminal device and symbols addressed to one or more second terminal devices have been added. The terminal device includes a signal detection unit that detects a signal addressed to the first terminal device assuming that in resources used by the signal addressed to the first terminal device, the same modulation scheme is multiplexed in all subcarriers.

(6) The terminal device according to the present invention further includes a control information demultiplexing unit that receives the same modulation scheme as control information.

Effects of the Invention

According to the present invention, DL-NOMA can be applied with a small amount of control information, which makes it possible to improve cell throughput or user throughput.

MODE FOR CARRYING OUT THE INVENTION

First Embodiment

A communication system according to the present embodiment includes at least one base station device (transmit device, cell, transmit point, transmit antenna group, transmit antenna port group, component carrier, evolved Node B (eNB)) and multiple terminal devices (terminal, mobile terminal, receive point, receive terminal, receive device, receive antenna group, receive antenna port group, User Equipment (UE)).

Figure 1:
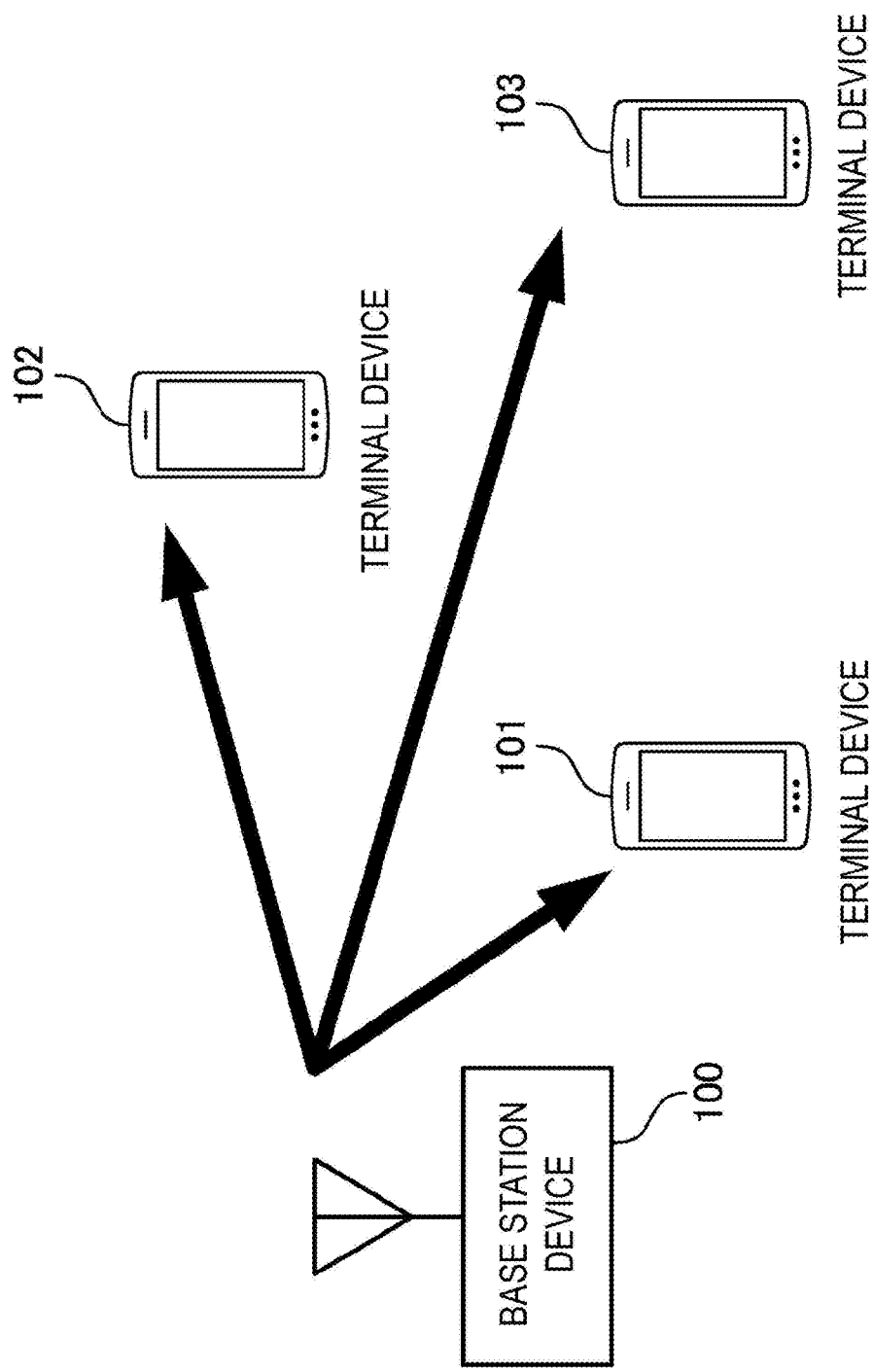
FIG. 1 is a diagram illustrating an example of a communication system.

FIG. 1 is a schematic diagram illustrating an example of down inks (forward links) in a cellular system according to a first embodiment of the present invention. In the cellular system illustrated in FIG. 1, there is one base station device (eNB) 100 and terminal devices 101 to 103 that connect to the base station device 100. The base station device 100 multiplexes signals addressed to the terminal devices 101 to 103 and transmits the signals on the same subcarrier. The signals addressed to any two of the terminal devices may be multiplexed rather than multiplexing all signals addressed to the three terminal devices. Also, there may be four or more terminal devices.

Figure 2:
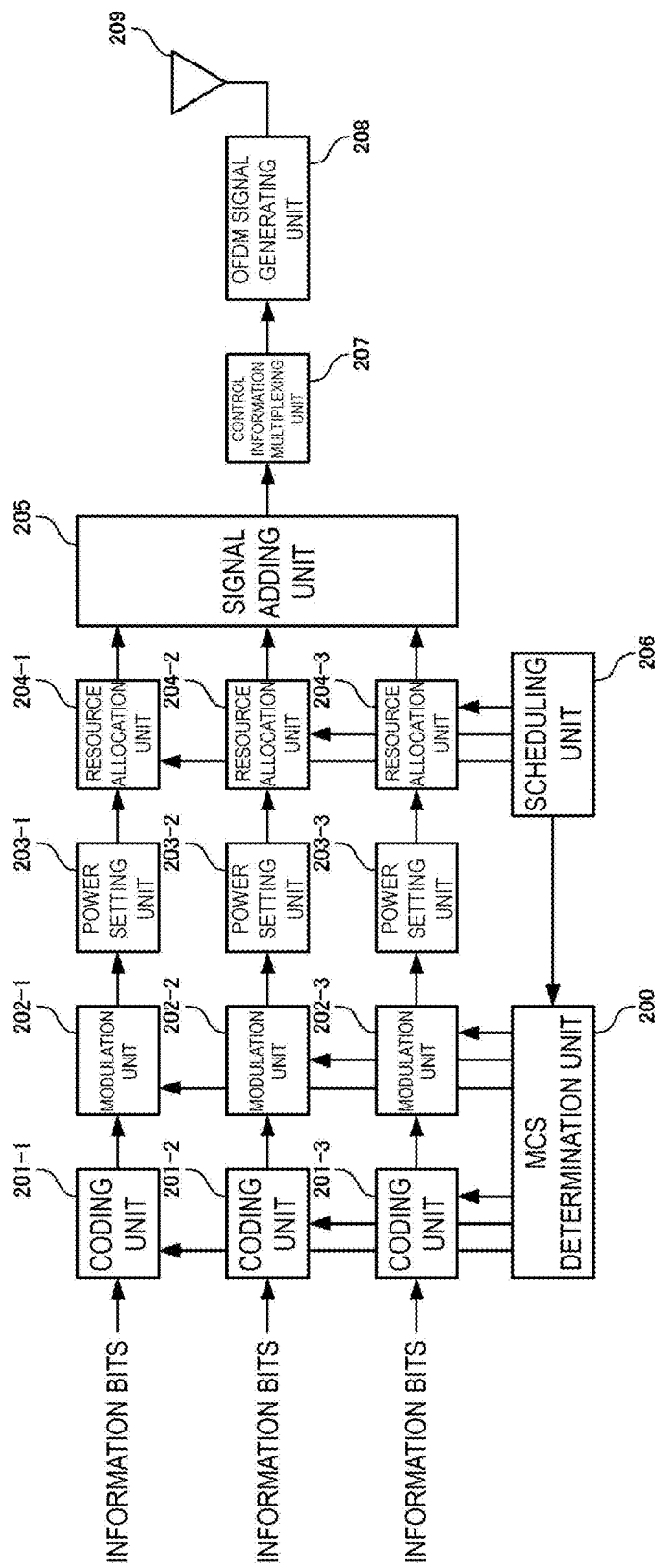
FIG. 2 is a diagram illustrating a transmitter configuration in a base station device according to the present invention.

FIG. 2 is a block diagram illustrating an example of a transmitter configuration of the base station device 100 carrying out DL-NOMA according to the present embodiment. Information bits are inputted to coding units 201-1 to 201-3, where error correction coding is applied. The coding rate used in the error correction coding is determined, for example, by information pertaining to MCS, inputted from an, MCS determination unit 200. Processing capable of improving the effects of error correction, such as bit interleaving, may be applied by the coding units 201-1 to 201-3. Error correction coding bits generated by the coding units 201-1 to 201-3 are inputted to modulation units 202-1 to 202-3, respectively, and processing for converting bit sequences into modulation symbol sequences is carried out. Here, each of the modulation units 202-1 to 202-3 may use a different modulation scheme for the generated modulation symbols, such as Quadrature Phase Shift Keying (QPSK), 16 Quadrature Amplitude Modulation (QAM), or 64 QAM. Which modulation scheme to use is determined, for example, by information pertaining to MCS, inputted from the MCS determination unit 200. Here, the information pertaining to the MCS of each terminal device is time-domain multiplexed or frequency-domain multiplexed by a control information multiplexing unit and communicated to the respective terminal devices.

The outputs of the modulation units 202-1 to 202-3 are inputted to power setting units 203-1 to 203-3, respectively. The power setting units 203-1 to 203-3 change the amplitudes (power, energy, spectral density) of the outputs of the modulation units 202-1 to 202-3. The power that is set may be determined in advance, or may be determined by a scheduling unit 206 in light of cell throughput, user throughput, or the like. The outputs of the power setting units 203-1 to 203-3 are inputted, to resource allocation units 204-1 and 204-2, respectively. The resource allocation units 204-1 to 204-3 allocate the signals inputted from the power setting units 203-1 to 203-3, respectively, to prescribed subcarriers accordance with allocation information inputted from the scheduling unit 206.

Figure 3:
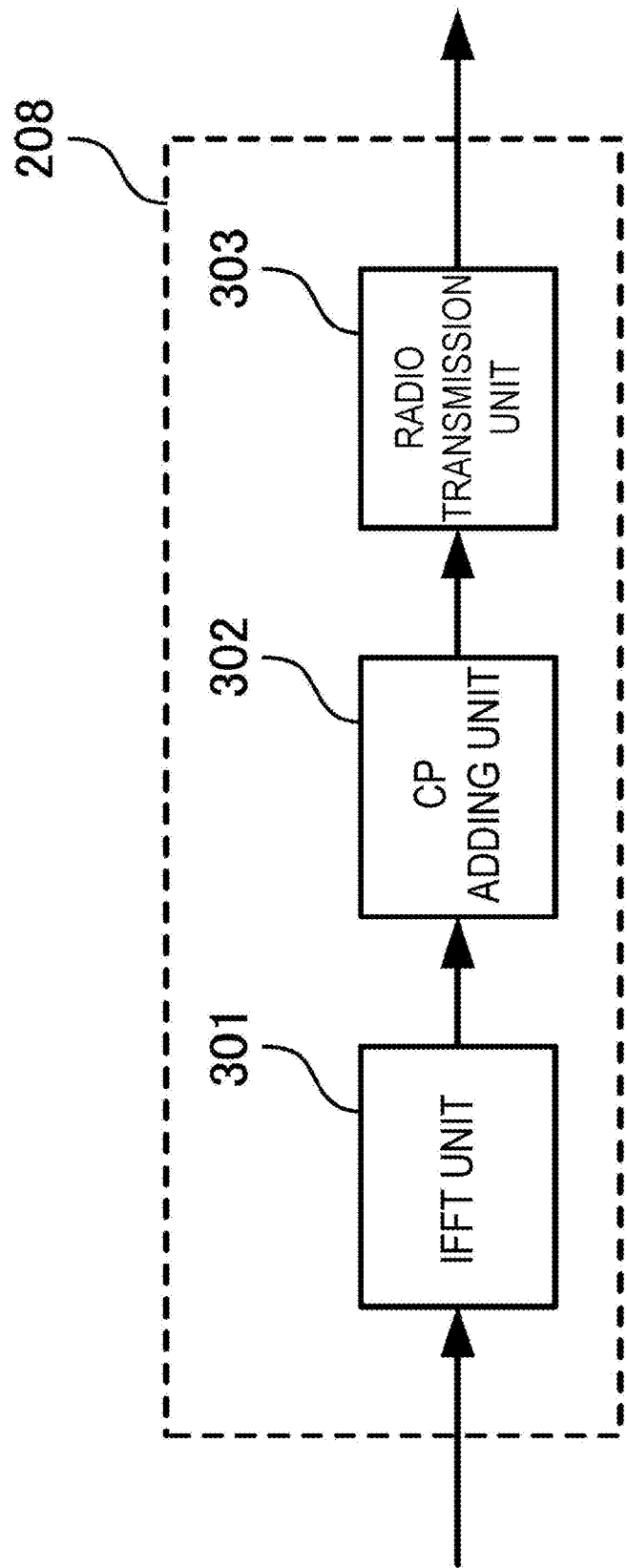
FIG. 3 is a diagram illustrating the configuration of an OFDM signal generating unit.

The outputs of the resource allocation units 204-1 to 204-3 are inputted to a signal adding unit 205. The signal adding unit 205 adds (combines; superposition coding) the outputs of the resource allocation units 204-1 to 204-2 on a subcarrier-by-subcarrier basis. In other words, in a case where some or all of the resources allocated by the resource allocation units 204-1 to 204-3 overlap, non-orthogonal multiplexing through superimposition (superposition coding) is carried out for those resources (subcarriers). A control information multiplexing unit 207 applies processing for multiplexing control information and the like required for reception processing in the terminal devices in the time domain, the frequency domain, and the like. Here, the control information includes MCS, allocation information, and the like. The output of the control information multiplexing unit 207 is inputted to an OFDM signal generating unit 208. FIG. 3 illustrates the configuration of the OFDM signal generating unit 208. As illustrated in FIG. 3, the output of the control information multiplexing unit 207 is inputted to an IFFT unit 301, where frequency-domain signals are converted to time-domain signals through Inverse Fast Fourier Transform (IFFT). The output of the IFFT unit 301 is inputted to a CP adding unit 302, where a Cyclic Prefix (CP) is added to achieve robustness to delayed waves. The output of the CP adding unit 302 is inputted to a radio transmission unit 303, where processing such as Digital to Analog (D/A) conversion, band limit filtering, and upconversion are applied. The output of the radio transmission unit 303 is transmitted from a transmit antenna 209, illustrated in FIG. 2, as the output of the OFDM signal generating unit 208. Although only one transmit antenna is illustrated in FIG. 2, multiple antennae may be included, and known techniques such as spatial multiplexing and transmit diversity may be used in combination.

Figure 4:
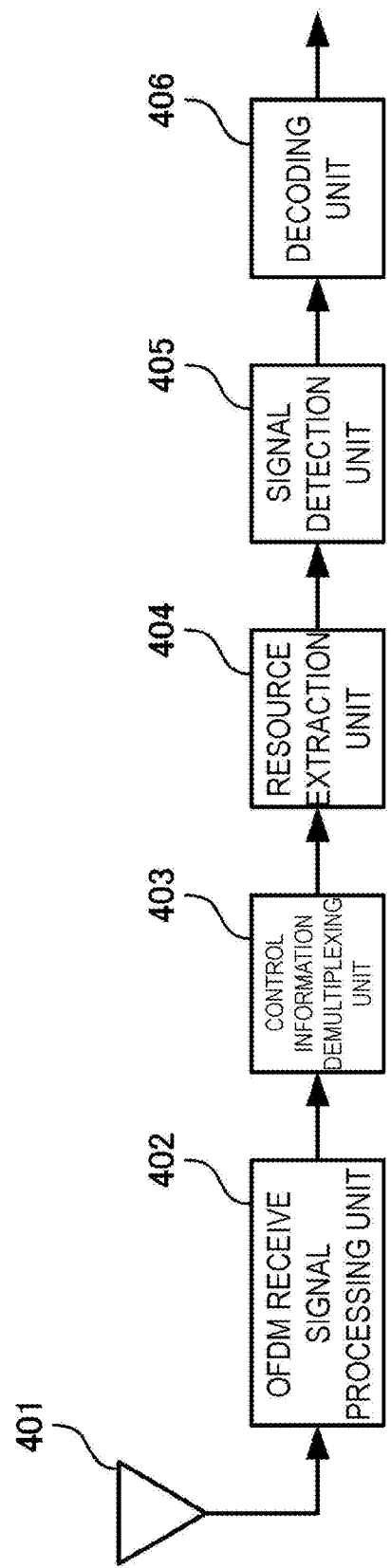
FIG. 4 is a diagram illustrating a receiver configuration in a terminal device according to the present invention.
Figure 5:
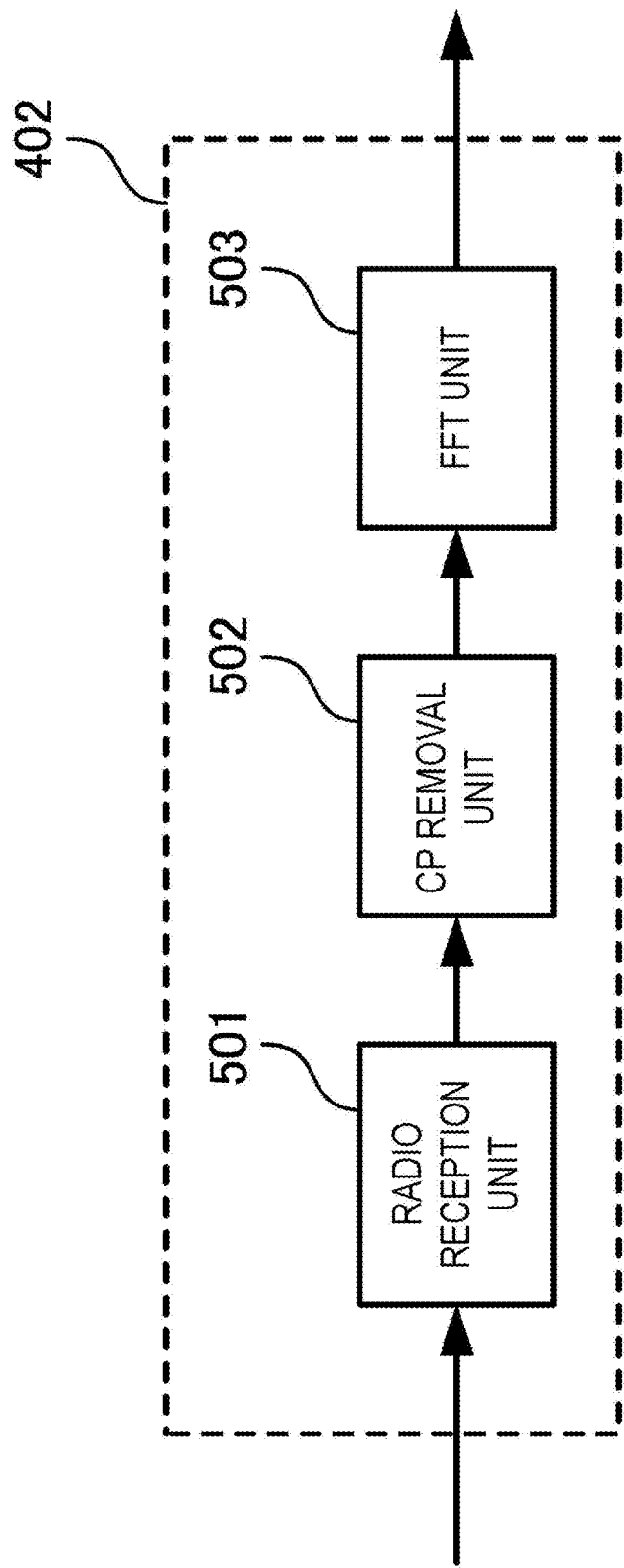
FIG. 5 is a diagram illustrating the configuration of an OFDM receive signal processing unit.

FIG. 4 illustrates a past example of a receiver configuration in the terminal device 101 (first terminal device) receiving a signal that has undergone DL-NOMA. A signal received via a receive antenna 401 is inputted to an OFDM receive signal processing unit 402. FIG. 5 illustrates an example of the configuration of the OFDM receive signal processing unit 402. The signal received by the receive antenna 401 is inputted to a radio reception unit 501, where processing such as downconversion, filtering, and A/D conversion are carried out. The output of the radio reception unit 501 is inputted to a CP removal unit 502, which removes the CP inserted on the transmission side. The output of the CP removal unit 502 is inputted to a FFT unit 503, where time-domain signals are converted to frequency-domain signals through FFT. The output of the FFT unit 503 is inputted to, a control information demultiplexing unit 403 in FIG. 4. The control information demultiplexing unit 403 demultiplexes the control information from the received signal. The obtained control information (MCS, allocation information, or the like) is used in reception processing in a later stage. The signal aside from the control information is inputted to a resource extraction unit 404. The resource extraction unit 404 extracts the resources (subcarrier) allocated to the signal addressed to the terminal device 101. Information required for the resource extraction includes the control information obtained by the control information demultiplexing unit, control information communicated separately from a higher layer, and the like.

The output of the resource extraction unit 404 is inputted to a signal detection unit 405. The signal detection unit 405 first compensates for effects of the channel. Typically, as channel compensation, a reference signal (a Demodulation Reference Signal (DMRS), also called a UE-specific Reference Signal (URS), a Cell-specific Reference Signal (CRS), or the like), which is a known signal, is transmitted from the transmit device, and the channel is estimated in the reception thereof to carry out channel estimation. The channel compensation is carried out on the basis of a channel estimation value obtained as a result. The signal detection unit 405 detects a signal candidate point having a minimum Euclidean distance from receive signal points and transmit signal candidate points. A coding bit Log Likelihood Ratio (LLR) is calculated from the detection result, and is inputted to a decoding unit 406 to obtain a decoding result. Here, the generation of the transmit signal candidate point requires the modulation scheme used for the signal addressed to the terminal itself and the modulation scheme of the non-orthogonally multiplexed signals addressed to other terminal devices. In LTE, the modulation scheme used for the signal addressed to the terminal itself is communicated, but the modulation schemes of the signals addressed to the other terminal devices are not communicated.

Although it is conceivable for the base station device to communicate the modulation scheme of the non-orthogonally multiplexed signals addressed to the other terminal devices to the terminal device through a control channel or higher layer, there is a problem in that doing so increases the amount of control information. Accordingly, a method of blind detection through which the terminal device 101 determines whether or not an interference signal (a non-orthogonally multiplexed signal) is present can be considered. By using blind detection, the terminal device can, in each subcarrier, determine first whether a signal is non-orthogonally multiplexed, and in the case where the signal is non-orthogonally multiplexed, can estimate what modulation scheme is used in the non-orthogonal multiplexing. This makes communicating the control information unnecessary, which makes it possible to increase throughput.

Figure 6:
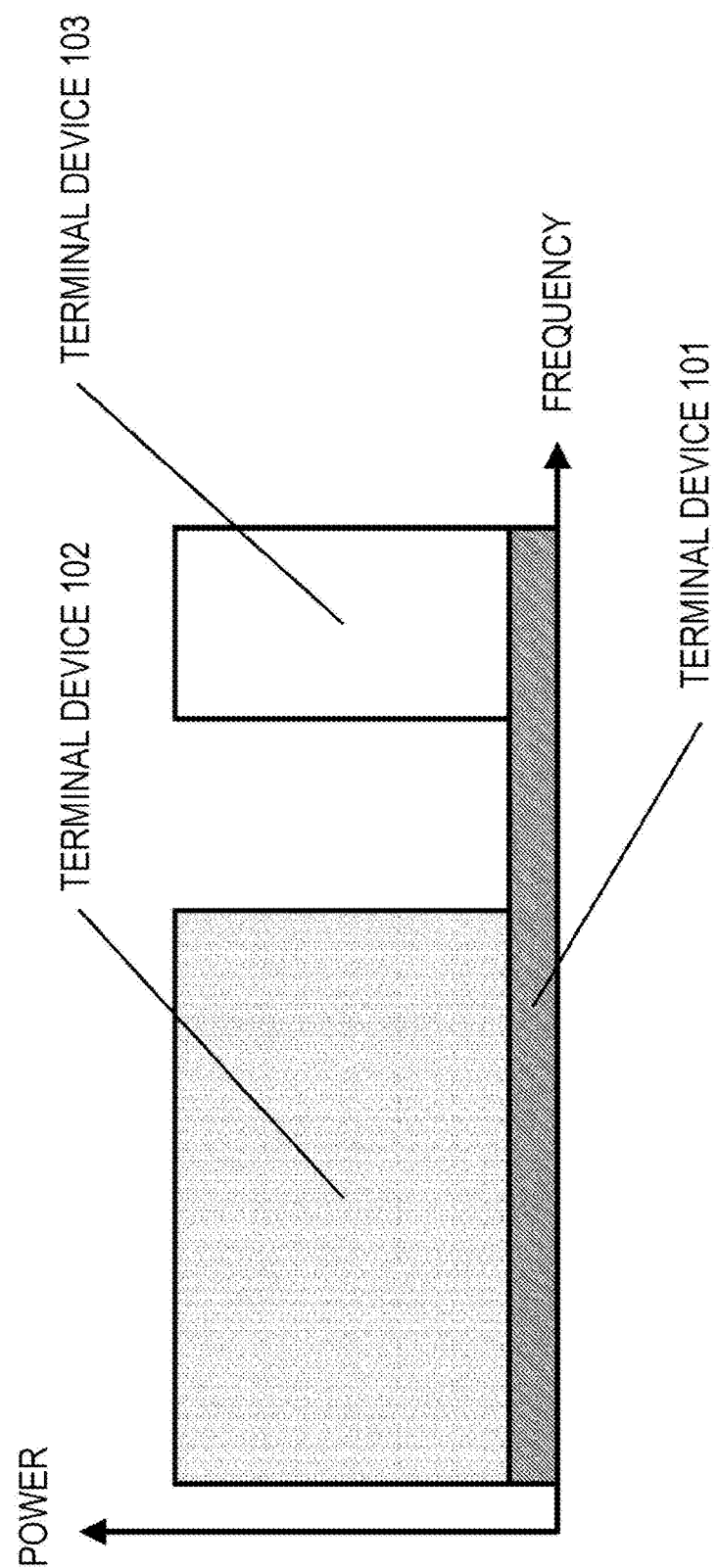
FIG. 6 is a diagram illustrating an example of DL-NOMA resource allocation.

Here, blind detection in a case where resources are allocated as indicated in FIG. 6 will be considered. Signals addressed to the terminal device 102 and the terminal device 103 (signals addressed to second terminal devices) are multiplexed on the subcarrier used by a signal addressed to the terminal device 101, and furthermore, there are subcarriers where no multiplexing is carried out. In the case illustrated in FIG. 6, the signals addressed to the terminal device 102 and the terminal device 103, to which a high level of power (energy) is allocated, can be assumed to have the same transmission quality throughout all the subcarriers used. However, with the terminal device 101, different terminal devices act as interference from subcarrier to subcarrier, and thus the same quality cannot be expected throughout all the subcarriers used. It is therefore necessary to carry out blind detection independently by subcarrier (or resource block, subband, or the like), and thus there are problems in that the processing becomes complicated and the modulation schemes of interference signals may be erroneously detected. In DL-NOMA, the interference power is much higher than the power of the signal addressed to the station itself, and thus bit errors are highly likely to occur in the case where the modulation schemes of interference signals are erroneously detected.

A case where the modulation schemes of the interference signals are not estimated through blind detection will be considered next. In this case, the base station device 100 communicates "the terminal device 102 and the terminal device 103 being multiplexed, and the modulation scheme used by the terminal device 102 and the terminal device 103 to the terminal device 101" to the terminal device 101. It is therefore necessary for the modulation scheme and the resource allocation used to transmit the signals to be communicated to the terminal device 101, which leads to a large amount of control information. Even in the case where the resource allocation is determined or communicated in advance, the control information required to communicate the modulation scheme increases in proportion with the number of interference signals. Furthermore, if there are different numbers of interference signals, the amount of control information will also change, which is problematic in terms of the configuration of the control channel or higher layer.

Figure 7:
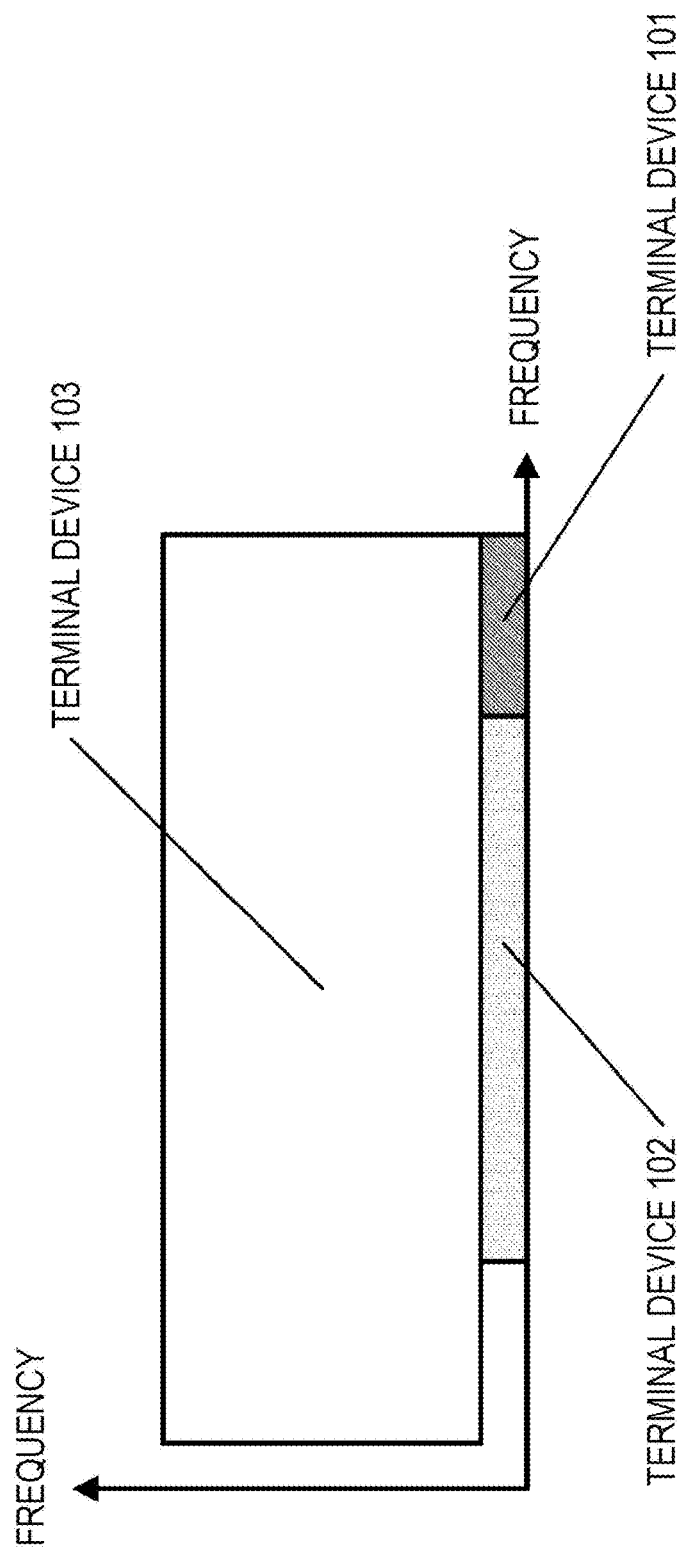
FIG. 7 is a diagram illustrating an example of DL-NOMA resource allocation according to the present invention.

Accordingly, the present embodiment assumes resources allocated as illustrated in FIG. 7. The difference from FIG. 6 is that for a terminal device to which a low power is allocated (a terminal device applying MLD, and that uses blind detection to estimate the modulation scheme to interfering terminal devices), the interfering terminal devices are the same throughout all the subcarriers used. In the case where resources are allocated as illustrated in FIG. 7, a terminal device carrying out blind detection can estimate the modulation scheme of interference signals through blind detection, assuming that the interfering terminal devices are the same throughout all the subcarriers used. It is this possible to carry out blind detection that is more accurate than in the case where the presence/absence of interference signals and the modulation schemes thereof differ from subcarrier to subcarrier, as in FIG. 6. Improving the accuracy of the blind detection makes it possible to apply MLD appropriately, and thus the bit error rate in signals addressed to the terminal itself can be reduced. Additionally, if the modulation scheme of terminal devices to which a high power is allocated (the terminal device 103, in FIG. 7) is fixed to QPSK, the DL-NOMA reception processing can be carried out blindly simply by estimating whether or not the interference signals are multiplexed. Note that for a terminal device to which a high power is allocated (the terminal device 103, in FIG. 7), the modulation scheme of the modulation scheme of the interference signals will change throughout all the subcarriers used. However, the terminal device 103 to which a high transmit power is allocated does not absolutely need to apply MLD or SIC, and thus the interference signals having different modulation schemes will have little effect on throughput. Additionally, the transmit power to the terminal device 103 is high, and thus the presence/absence of interference signals differing from subcarrier to subcarrier only causes a slight drop in performance in the terminal device 103.

A case where the modulation scheme is communicated without carrying out blind detection will be considered next. Unlike in FIG. 6, the interfering terminal devices are the same throughout all subcarriers used by the terminal device 101 in FIG. 7. As a result, the terminal device 101 can carry out signal detection through MLD simply by the base station device 100 communicating a single instance of information pertaining to the modulation scheme of the interference signals to the terminal device 101. In other words, the allocation illustrated in FIG. 6 makes it possible to greatly reduce the amount of control information. Note that the above-described information pertaining to the modulation scheme is constituted, of 2 bits, for example, where '00' indicates the interference signal modulation scheme is QPSK, '01' indicates 16 QAM, '10' indicates 64 QAM, and '11' indicates 256 QAM. In the case where 256 QAM is not used, 11' may indicate that no interference signal is present. Furthermore, the information indicated by the 2-bit control information may be changed in accordance with a notification in a higher layer. It is not necessary for the control information to be 2 bits, and the control information may be 1 bit instead. In the case of 1 bit, '0' may communicate that there is no interference, whereas '1' may communicate that there is interference. In this case, the terminal device to which the control information is communicated estimates the interference signal modulation scheme through blind detection in the case of a notification of '1'. In the case where the modulation scheme is set to QPSK for high-power signals in the system, the terminal device 101 can ascertain the modulation order of interference signals without carrying out blind detection.

Thus, according to the present embodiment, the allocation of resources to cell-edge terminal devices is carried out so as to include the allocation of resources to cell-center terminal devices. As a result, a terminal device that needs to carry out blind detection can assume that the presence/absence of interference and the modulation scheme is constant throughout all the subcarriers used. This makes it easy to estimate the modulation signal of the interference signals through blind detection, and estimation errors can be reduced, which makes it possible to increase throughput. Even in the case where communicating information pertaining to the interference signals is assumed rather than blind detection, cell-center terminal devices need not be notified of the interference signal resource allocation. Additionally, the number of interfering terminals does not change, and thus the modulation scheme of the interference signals, or the presence/absence thereof, can be communicated with a limited number of bits. The control information can be reduced as a result.

Second Embodiment

In the first embodiment, for terminal devices participating in DL-NOMA, the allocation of resources to cell-edge terminal devices is carried out so as to include the allocation of resources to cell-center terminal devices, which makes it easy to carry out blind detection and makes it possible to communicate information of the interference signals with limited control information. However, this adds a limitation in that the allocation of resources for signals addressed to cell-edge terminal devices includes the allocation of resources to cell-center terminal devices.

Accordingly, the present embodiment describes a method that makes blind detection pertaining to interference signals easy and reduces notification information in cases where the allocation of resources to cell-center terminal devices includes the allocation of resources to cell-edge terminal devices.

Figure 8:
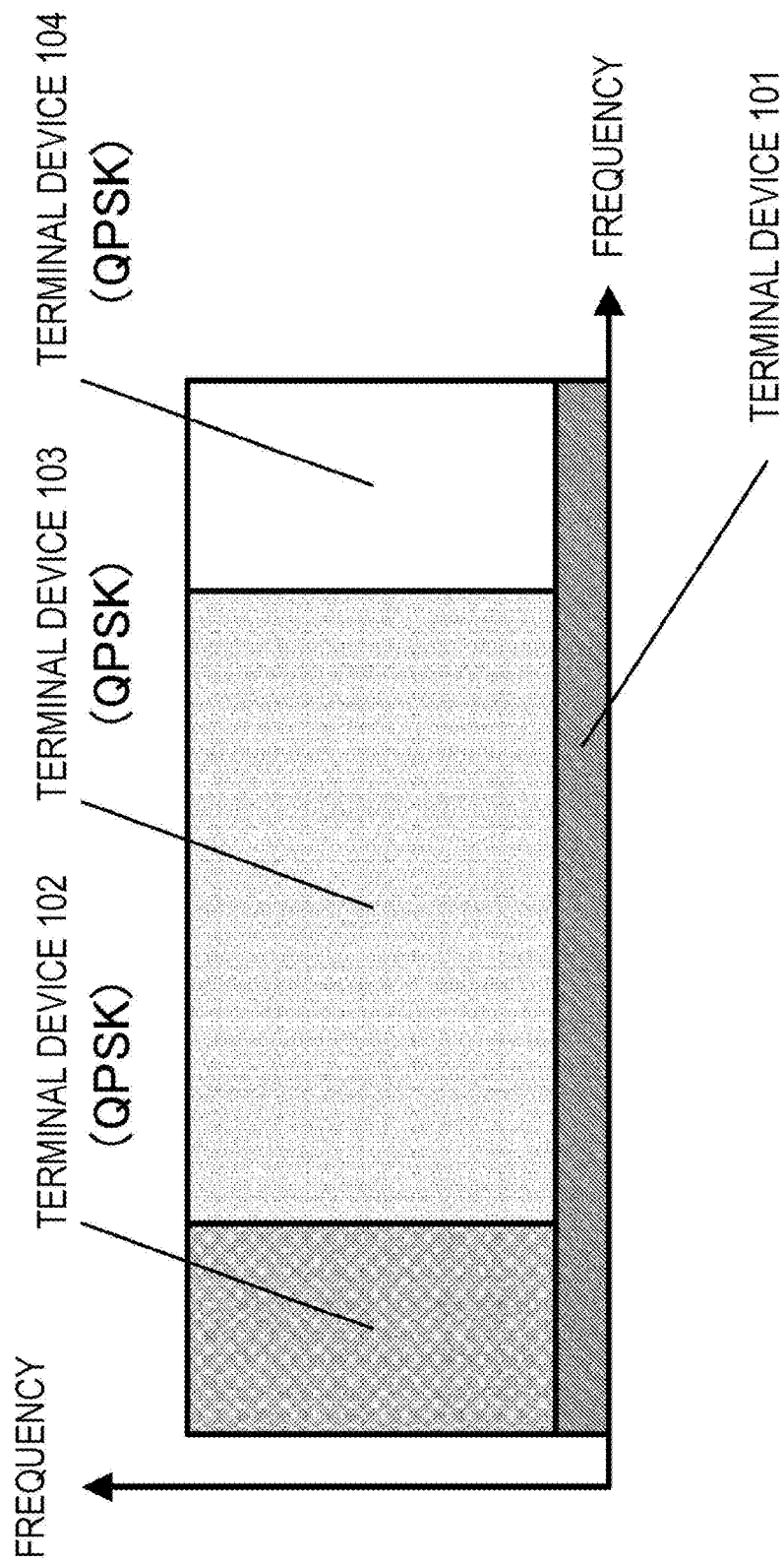
FIG. 8 is a diagram illustrating an example of DL-NOMA resource allocation according to the present invention.

Although the transmitter configuration according to the present embodiment is the same as in the first embodiment, the processing carried out by the scheduling unit 206 is different. FIG. 8 illustrates an example of resource allocation carried out by, the scheduling unit 206 in the present embodiment. In FIG. 8, a terminal device 101, which is a cell-center terminal device, undergoes resource allocation including resource allocations for a terminal device 102, a terminal device 103, and a terminal device 104, which act as interference signals. In this state, blind detection in the terminal device 101 is difficult, as described with reference to FIG. 6. Accordingly, in the present embodiment, the MCS determination unit 200 carries out control such that the signals addressed to the terminal device 102, the terminal device 103, and the terminal device 104, which act as interference signals, have the same modulation scheme. Through this, the interference signal modulation scheme is the same throughout all the subcarriers used for the terminal device 101, which makes it easy to carry out blind detection. The error rate in estimating the interference signal modulation scheme through blind detection can therefore be reduced, which makes it possible to correctly detect signals addressed to the station itself and increase throughput. Although it is necessary for the modulation schemes to be the same for the terminal device 102, the terminal device 103, and the terminal device 104 acting as interference signals, the coding rate can be configured freely for each terminal device. QPSK is usually used for terminals at the cell edge, and it is rare for 16 QAM or 64 QAM to be used; as such, there is substantially almost no drop in throughput for terminals at the cell edge. However, the terminal device 101 can carry out highly-accurate blind detection, and thus throughput can be greatly increased.

Although the foregoing assumes that the terminal device 101 carries out blind detection, the scheduling method according to the present embodiment is also effective in the case where information pertaining to the modulation scheme is communicated. In the case where the interference signal modulation scheme differs from terminal device to terminal device as in FIG. 6, it is necessary to communicate which modulation scheme is used in each subband, which increases the control information. However, in the case where, as illustrated in FIG. 8, the MCS determination unit 200 controls the interference signal modulation scheme so that the same modulation scheme is used throughout all the subcarriers used by the terminal device 101, the base station device need only notify the terminal device 101 of one modulation scheme. In other words, the interference signal modulation scheme can be communicated with limited control information.

Figure 9:
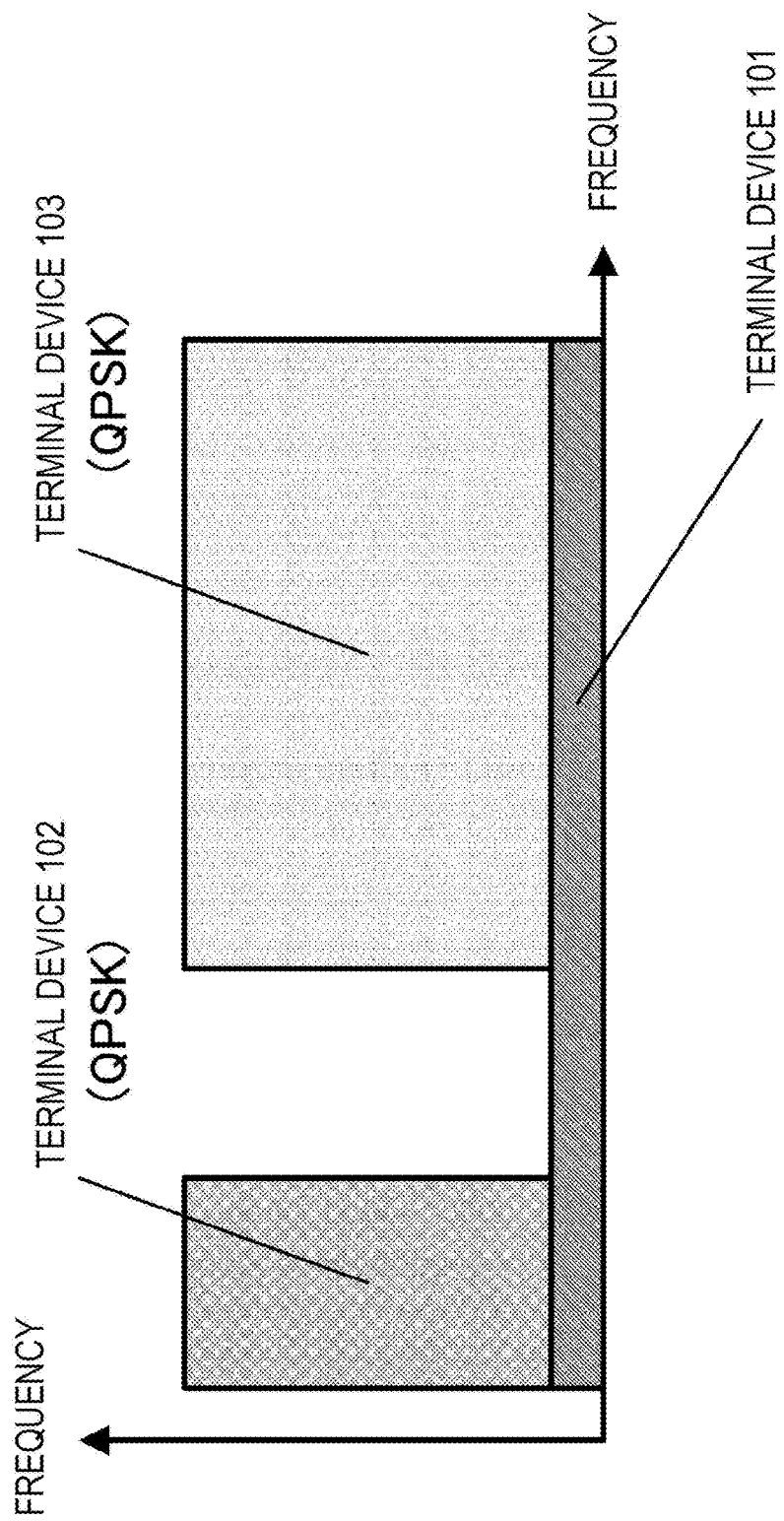
FIG. 9 is a diagram illustrating an example of DL-NOMA resource allocation according to the present invention.

Although FIG. 8 illustrates non-orthogonal multiplexing being applied throughout all the subcarriers used by the terminal device 101, the present embodiment is not limited thereto. For example, not applying non-orthogonal multiplexing to some of the subcarriers used by the terminal device 101 is also possible, as illustrated in FIG. 9. In this case, although it is necessary for the terminal device 101 to blindly detect whether or not non-orthogonal multiplexing is applied to each subcarrier (subband), for subcarriers for which it is determined that non-orthogonal multiplexing is applied, the interference signal modulation schemes can be estimated through blind detection assuming that the interference signal modulation schemes are the same. The accuracy of estimation through blind detection can be improved as a result, which makes it possible to increase throughput. Additionally, the interference signal modulation scheme is communicated, and the terminal device 101 need only carry out blind detection for whether a non-orthogonally multiplexed signal is present/absent. At this time, the above-described information pertaining to the interference signal modulation scheme is constituted of 2 bits, for example, where '00' indicates the interference signal modulation scheme is QPSK, '01' indicates 16 QAM, '10' indicates 64 QAM, and '11' indicates 256 QAM. In the case where 256 QAM is not used, '11' may indicate that no interference signal is present on all subcarriers used by the terminal device.

As described above, in the case where resources are allocated as illustrated in FIG. 9, it is necessary to identify the subcarrier where non-orthogonal multiplexing is not carried out through blind detection. Additionally, in the case where resources are allocated as illustrated, the presence/absence of interference for the terminal device 103 differs from subcarrier to subcarrier. Thus, if reference signals or the like are averaged throughout all the subcarriers used, discrepancies from the actual transmission arise, which may cause the performance to degrade.

Figure 10:
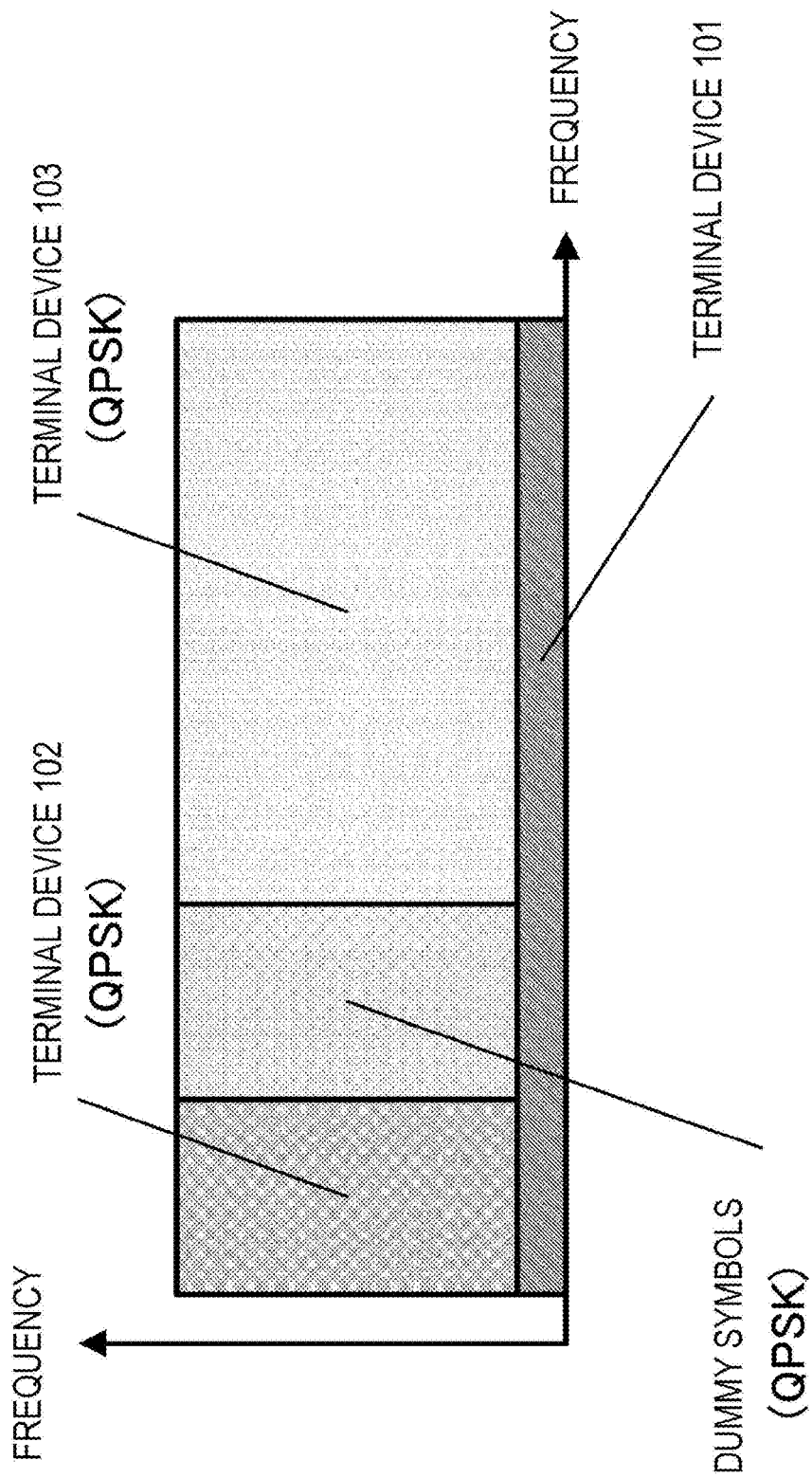
FIG. 10 is a diagram illustrating an example of DL-NOMA resource allocation according to the present invention.
Figure 11:
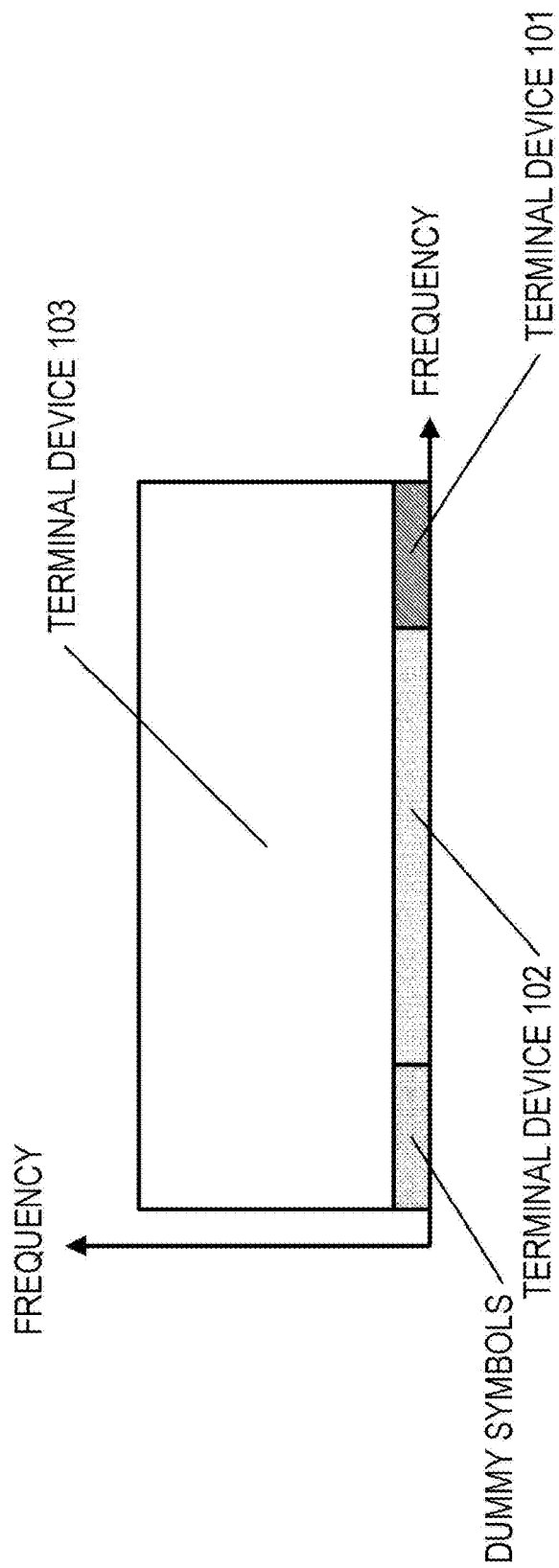
FIG. 11 is a diagram illustrating an example of DL-NOMA resource allocation according to the present invention.

Accordingly, non-orthogonally multiplexing dummy symbols on the subcarrier where non-orthogonal multiplexing is not carried out can be considered, as illustrated in FIG. 10. Here, control is carried out such that the modulation scheme of the dummy symbols is the same as the modulation scheme for the other interference signals. As a result, the terminal device need not carry out blind detection for whether non-orthogonally multiplexed signals are present/absent for each subcarrier, and the modulation scheme of interfering signals is the same throughout all the subcarriers used, which increases the accuracy of the blind detection. In the case where the modulation scheme is communicated from the base station device 100, the interference modulation scheme for all of the subcarriers used can be communicate with a single instance of control information. In the case where resources are allocated as illustrated in FIG. 11, interference is present for the terminal device 103 throughout all the subcarriers used. Thus, if reference signals or the like are averaged throughout all the subcarriers used, communication is possible without discrepancies from the actual transmission. The dummy symbol sequence may be determined by the base station device, or a specific pattern may be used so that the sequence is known during transmission/reception. In this case, the inserted dummy symbols can be handled as a reference signal or the like, and thus the transmission quality can be improved.

According to the present embodiment, in the case where non-orthogonal multiplexing is carried out without using the same resource allocation for a cell-center terminal device and a cell-edge terminal device, the allocation is carried out such that the allocation of resources used for communication by talc cell-center terminal device includes the allocation of resources used for communication by the cell-edge terminal device. At this time, multiple cell-edge terminal devices participating in the non-orthogonal multiplexing are controlled to use the same modulation scheme. This makes it easy for the cell-center terminal device to carry out blind detection. In the case where information pertaining to the modulation scheme is communicated from the base station without carrying out blind detection, the interference signal modulation scheme can be communicated with limited control information. The throughput can be increased as a result.

Note that a program running on the base station device and the terminal device according to the present invention is a program that controls a CPU and the like (a program for causing a computer to operate) in such a manner as to realize the functions according to the above-described embodiments of the present invention. The information handled by these devices is temporarily held in RAM at the time of processing, and is then stored in a ROM, an HDD, or the like, read out by the CPU as necessary, and edited and written. A semiconductor medium (a ROM, a non-volatile memory card, or the like, for example), an optical recording medium (a DVD, an MO, an MD, a CD, a BD, or the like, for example), a magnetic recording medium (magnetic tape, a flexible disk, or the like, for example), and the like can be given as examples of recording media for storing the programs. In addition to realizing the functions of the above-described embodiments by executing loaded programs, the functions of the present invention are realized by the programs running cooperatively with an operating system, other application programs, or the like in accordance with instructions included in those programs.

When delivering these programs to market, the programs can be stored in a portable recording medium, or transferred to a server computer connected via a network such as the Internet. In this case, the storage device serving as the server computer is also included in the present invention. Furthermore, some or all portions of each of the terminal device and the base station device according to the above-described embodiments may be realized as an LSI that is a typical integrated circuit. The functional blocks of the reception device may be individually realized as chips, or may be partially or completely integrated into a chip. In the case where the functional blocks are realized as integrated circuits, an integrated circuit controller that controls those blocks is added.

The circuit integration technique is not limited to LSI, and the integrated circuits for the functional blocks may be realized as dedicated circuits or a multi-purpose processor. Furthermore, if with advances in semiconductor technology, a circuit integration technology with which an LSI is replaced appears, it is also possible to use an integrated circuit based on the technology.

Note that the present, invention is not limited to the embodiments described above. The terminal device according to the present invention is not limited to being applied in a mobile station device, and can of course be applied to a fixed-type electronic device installed indoors or outdoors, or a stationary-type electronic device, for example, an AV device, a kitchen device, a cleaning or washing machine, an air-conditioning unit, office equipment, a vending machine, and other household devices.

Embodiments of the invention have been described in detail thus far with reference to the drawings, but the specific configuration is not limited to the embodiments. Other designs and the like that do not depart from the essential spirit of the invention also fall within the scope of the patent claims.

INDUSTRIAL APPLICABILITY

The present invention is useful in terminal devices, base station devices, communication systems, and communication methods.

This application claims priority based on JP 2015-098652, filed on May 14, 2015, and the entire contents of JP 2015-098652 are incorporated herein by reference.

DESCRIPTION OF REFERENCE NUMERALS

100 Base station device
101-103 Terminal device
200 MCS determination unit
201-1-201-3 Coding unit
202-1-202-3 Modulation unit
203-1-203-3 Power allocation unit
204-1-204-3 Resource allocation unit
205 Signal adding unit
206 Scheduling unit
207 Control information multiplexing unit
208 OFDM signal generating unit
209 Transmit antenna
301 IFFT unit
302 CP adding unit
303 Radio transmission unit
401 Receive antenna
402 OFDM receive signal, processing unit
403 Control information demultiplexing unit
404 Resource extraction unit
405 Signal detection unit
406 Decoding unit
501 Radio reception unit
502 CP removal unit
503 FFT unit

The invention claimed is:

1. A base station device configured to communicate with a terminal device, the base station device comprising:
  modulation circuitry configured to take at least a first plurality of bits as input and produce modulation symbols, and
  radio transmission circuitry configured to transmit the modulation symbols and transmit control information, wherein
  the control information includes 2-bit information field related to an interference signal,
  in a case that the 2-bit information field has a first value, the 2-bit information field indicates that the interference signal is not present, and
  in a case that the 2-bit information field has one of values other than the first value, the 2-bit information field indicates that the interference signal is present with one of a first modulation scheme, a second modulation scheme, and a third modulation scheme, and the radio transmission circuitry is configured to transmit the interference signal with the one of the first modulation scheme, the second modulation scheme, and the third modulation scheme.

2. A terminal device configured to communicate with a base station device, the terminal device comprising:
  signal detection circuitry configured to receive modulation symbols produced by taking a first plurality of bits as input, and
  radio reception circuitry configured to receive control information, wherein
  the control information includes 2-bit information field related to an interference signal,
  in a case that the 2-bit information field has a first value, the 2-bit information field indicates that the interference signal is not present, and
  in a case that the 2-bit information field has one of values other than the first value, the 2-bit information field indicates that the interference signal is present with one of a first modulation scheme, a second modulation scheme, and a third modulation scheme, and the signal detection circuitry is configured to receive-the interference signal with the one of the first modulation scheme, the second modulation scheme, and the third modulation scheme.

3. A communication method for a base station device configured to communicate with a terminal device, the communication method comprising the steps of:
  taking at least a first plurality of bits as input and producing modulation symbols, and
  transmitting the modulation symbols and transmit control information, wherein
  the control information includes 2-bit information field related to an interference signal,
  in a case that the 2-bit information field has a first value, the 2-bit information field indicates that the interference signal is not present, and
  in a case that the 2-bit information field has one of values other than the first value, the 2-bit information field indicates that the interference signal is present with one of a first modulation scheme, a second modulation scheme, and a third modulation scheme, and the interference signal is transmitted with the one of the first modulation scheme, the second modulation scheme, and the third modulation scheme.

4. A communication method for a terminal device configured to communicate with a base station device, the communication method comprising the steps of:
  receiving modulation symbols produced by taking a first plurality of bits as input, and
  receiving control information, wherein
  the control information includes 2-bit information field related to an interference signal,
  in a case that the 2-bit information field has a first value, the 2-bit information field indicates that the interference signal is not present, and
  in a case that the 2-bit information field has one of values other than the first value, the 2-bit information field indicates that the interference signal is present with one of a first modulation scheme, a second modulation scheme, and a third modulation scheme, and the interference signal is received with the one of the first modulation scheme, the second modulation scheme, and the third modulation scheme.

* * * * *